United States Patent [19]
Speelman, III

[11] Patent Number: 5,289,996
[45] Date of Patent: Mar. 1, 1994

[54] AIRCRAFT WINDSHIELD SYSTEM WITH FRANGIBLE PANEL FOR AIRCREW EMERGENCY ESCAPE

[75] Inventor: Ralph J. Speelman, III, Dayton, Ohio

[73] Assignee: The United States of America as represented by the Secretary of the Air Force, Washington, D.C.

[21] Appl. No.: 43,705

[22] Filed: Apr. 7, 1993

[51] Int. Cl.$^5$ .............................................. B64C 1/32
[52] U.S. Cl. ................................ 244/122 AF; 244/121
[58] Field of Search ....................... 244/121, 122 AF

[56] References Cited

U.S. PATENT DOCUMENTS

| | | | |
|---|---|---|---|
| H451 | 4/1988 | Pinnell | 244/121 |
| 3,618,881 | 11/1971 | Fellers et al. | 244/121 |
| 3,880,387 | 4/1975 | Martin, Jr. | 244/121 |
| 4,570,879 | 2/1986 | Dupin | 244/121 |
| 5,085,383 | 2/1992 | Larkin et al. | 244/121 |

*Primary Examiner*—Michael S. Huppert
*Assistant Examiner*—Anne E. Bidwell
*Attorney, Agent, or Firm*—Fredric L. Sinder; Thomas L. Kundert

[57] ABSTRACT

An improved aircraft cockpit canopy for allowing thru-the-canopy ejection of an ejection seat is disclosed. The canopy includes windshield and side sections of transparency panels tough enough to withstand high energy bird strikes and a portion of an overhead section of the canopy made of a frangible transparency panel that will break into small fragments if struck by an ejecting ejection seat. The frangible transparency panel is made thinner than the tougher transparency panel. The frangible transparency panel is held in place by either an elastomeric sealing gasket or by a metal bracket with an elastomeric sealing layer. Both the elastomeric sealing gasket and the metal bracket can be made to bend or break to release the frangible transparency panel when struck by an ejecting ejection seat. The elastomeric sealing gasket and the metal bracket can also absorb the dynamic oscillations of a bird strike elsewhere on the canopy. The improved aircraft canopy can also be made by direct forming, where the area of the canopy through which an ejection seat will exit is made more frangible by modifying the material properties of the transparency at that location, by making the transparency thinner over that area, by scoring the transparency over that area or by a combination of those and other methods.

2 Claims, 2 Drawing Sheets

AIRCRAFT WINDSHIELD SYSTEM WITH FRANGIBLE PANEL FOR AIRCREW EMERGENCY ESCAPE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to emergency ejection systems for high-performance aircraft, and more particularly to an aircraft canopy that allows thru-the-canopy ejection of an ejection seat.

Modern high-speed, high-performance military aircraft are provided with emergency escape systems so that pilots and other aircrew members can quickly, and safely, exit the aircraft in case of emergency. The primary component of these systems is typically an explosively fired ejection seat. Unfortunately, most of these ejection seat systems impose a dangerous delay while the canopy is mechanically jettisoned or opened, or while a pyrotechnic charge built into the canopy transparency is fired to jettison or release part of the canopy or to burn open a hole for passage of the ejection seat.

Aircraft windshield and canopy systems are designed to meet a number of critical requirements, particularly impact protection from high energy bird strikes. Satisfying these requirements inevitably results in a transparency so tough that it must be pyrotechnically removed or severed in order to provide a clear path for ejection of an ejection seat. A transparency made of frangible material that would safely break into many small fragments when struck by the top of an ejection seat would similarly break into many small pieces when struck by a bird or airborne debris. Frangible materials can be made very strong but, almost by their very nature, cannot be made very tough.

Thus it is seen that there is a need for an aircraft canopy transparency that is both sufficiently frangible to permit an ejection seat to burst through without delay or pyrotechnics and without harm to the aircrew member, and at the same time sufficiently tough to provide adequate bird strike protection.

It is, therefore, a principal object of the present invention to provide an aircraft canopy transparency that is preferentially tough where bird strikes are likely to occur and preferentially frangible over the area where an ejection seat will exit the cockpit.

It is a feature of the present invention that it works without explosives.

It is another feature of the present invention that it does not sacrifice critical high energy bird strike protection.

It is an advantage of the present invention that it works without imposing any delay before the ejection seat can be ejected.

It is another advantage of the present invention that it does not increase the bulkiness of the canopy transparency.

It is a further advantage of the present invention that it does not materially interfere with vision through the canopy.

It is yet another advantage of the present invention that it is straightforward and low cost.

These and other objects, features and advantages of the present invention will become apparent as the description of certain representative embodiments proceeds.

SUMMARY OF THE INVENTION

The present invention provides an aircraft canopy transparency that simply and effectively provides both sufficient toughness for bird strike protection and a frangible area for passage of an ejection seat. The unique discovery of the present invention is the simple, yet surprisingly previously unknown, realization that, while bird strike protection is needed on the windshield and side portions of a cockpit transparency, the portion of a cockpit canopy above the aircrew through which an ejection seat or seats would eject can be made frangible without subjecting the aircrew to an unreasonable risk of harm from high energy bird strikes.

Accordingly, the present invention is directed to an aircraft cockpit canopy for allowing thru-the-canopy ejection of an ejection seat, comprising a first transparent panel for covering part of the area above the cockpit, wherein the first transparent panel can withstand high energy bird strikes, attached to the first transparent panel, a second transparent panel for covering a part of the area above the cockpit not covered by the first transparent panel, wherein the second transparent panel is frangible against the impact of an ejecting ejection seat, and wherein the area above the cockpit covered by the second transparent panel is the area through which would pass an ejecting ejection seat. The second transparent panel may be thinner than the first transparent panel. The second transparent panel may also be scored.

The invention is also directed to an aircraft cockpit canopy for allowing thru-the-canopy ejection of an ejection seat, comprising an injection molded transparent panel for covering the area above the cockpit, wherein the transparent panel can withstand high energy bird strikes over most of its surface area and is frangible against the impact of an ejecting ejection seat over that part of its surface area above the cockpit through which would pass an ejecting ejection seat. The frangible part of the surface area of the transparent panel may be thinner than the rest of the transparent panel. The thinner part of the surface area of the transparent panel may also be scored.

The invention is further directed to an aircraft cockpit canopy for allowing thru-the-canopy ejection of an ejection seat, comprising a first transparent panel for covering part of the area above the cockpit, attached to the first transparent panel, a second transparent panel for covering the part of the area above the cockpit not covered by the first transparent panel, wherein the area above the cockpit covered by the second transparent panel is the area through which would pass an ejecting ejection seat, and means for attaching the second transparent panel to the first transparent panel, wherein the attaching means is flexible so that if the second transparent panel were struck by an ejecting ejection seat, the flexible attaching means would flex and release the second transparent panel from its attachment to the first transparent panel. The means for attaching the second transparent panel to the first transparent panel may be breakable so that if the second transparent panel were struck by an ejecting ejection seat, the breakable attachment means would break and release the second transparent panel from its attachment to the first transparent panel.

DESCRIPTION OF THE DRAWINGS

The invention will be more clearly understood from reading the following detailed description of illustrative embodiments in conjunction with the accompanying drawings wherein.

DETAILED DESCRIPTION

Figure 1:
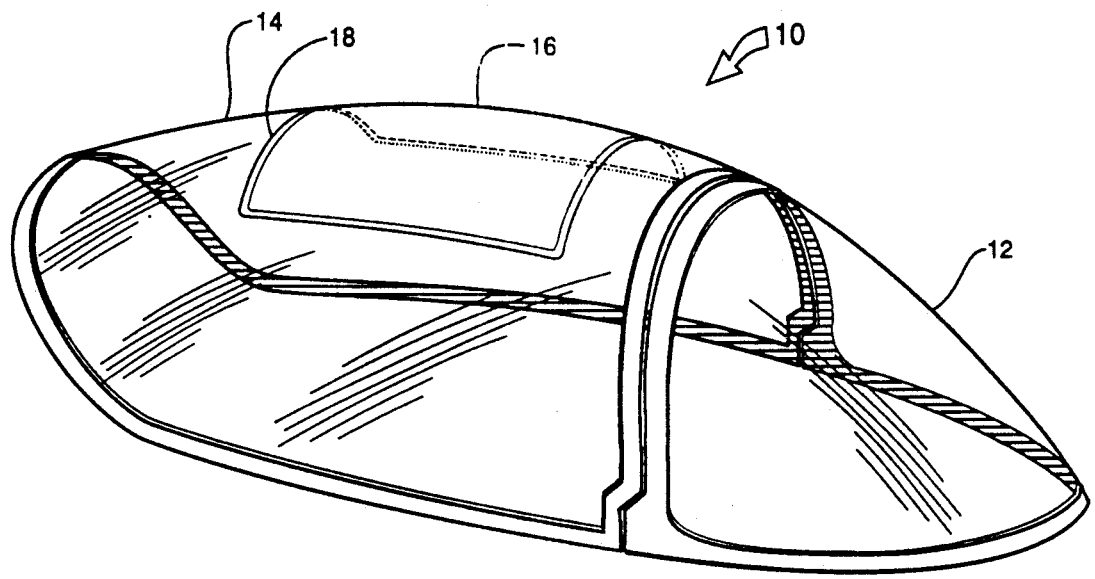
FIG. 1 is a perspective view of an aircraft canopy constructed according to the teachings of the present invention.

Referring now to FIG. 1 of the drawings, there is shown a perspective view of an aircraft canopy 10 constructed according to the teachings of the present invention. Canopy 10 includes a windshield section 12 and an overhead section 14. A panel 16, which is a part of overhead section 14, is defined by the opening required for an ejection seat (or seats) and an aircrew member (or members) to pass through or clear the canopy without harm to an aircrew member. Panel 16, in this embodiment, is made of transparent material formulated to be more brittle than usual for plastic panels intended for use in aircraft canopies. Panel 16 is also thinner than usual for such panels, and thinner than the rest of canopy 10, so that it will be more frangible, that is, so that it will break under impact in small fragments unlikely to harm an escaping aircrew member.

Aircraft canopies, whether made of acrylic plastic or the now more common polycarbonate plastic, need to be thick to have sufficient toughness to withstand a high energy bird strike. If toughness were not a requirement, they could be made thinner. It is unlikely that an acrylic or polycarbonate panel of bird impact resistant thickness could be made to be frangible. Glass is generally made frangible by introducing stress variations in the glass during its manufacture. Typically, the interior of the glass is made with a high level of built-in tensile stresses and the surface layers made with a high level of built-in compressive stresses. The high compressive stress surface layers provide great strength and balance the internal tensile stresses. A tremendous amount of stored elastic energy exists in such glasses and, when a surface layer is cracked, the release of that stored elastic energy causes the glass to break into many small particles. This process, even if extended to plastics, reduces toughness.

An example of the problems of trying to make a thick plastic panel frangible is shown by the following. One method of making a panel frangible is to score it so that it will break in a predefined pattern under impact. This works well with thin panels. A thick panel, however, will more often not break along the scoring and will break, if it breaks at all, in patterns nearly, if not completely, as unpredictable as if it had not been scored at all. Panel 16 is attached to panel 14 by an elastomeric sealing gasket 18.

Figure 2:
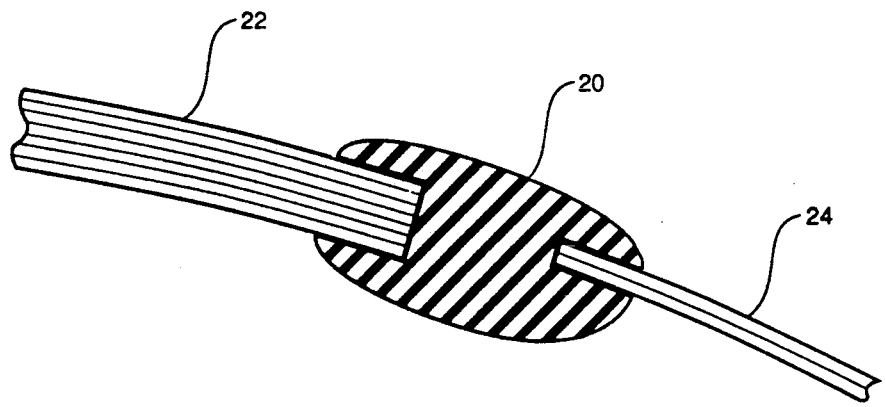
FIG. 2 is a cross-sectional view of an elastomeric sealing gasket for attaching a panel of tougher plastic to a panel of frangible plastic.

FIG. 2 is a cross-sectional view of an elastomeric sealing gasket 20 for attaching a panel 22 of thicker tougher plastic to a panel of thinner frangible material 24. Sealing gasket 20 may be made to not only serve as an attaching seal for panel 22 to panel 24, but also as a releasing device for the entire panel 24. When the top of an ejection seat strikes the inside of panel 24, it will either shatter or pop out of gasket 20, or both, so that the ejection seat will have an open escape path.

Figure 3:
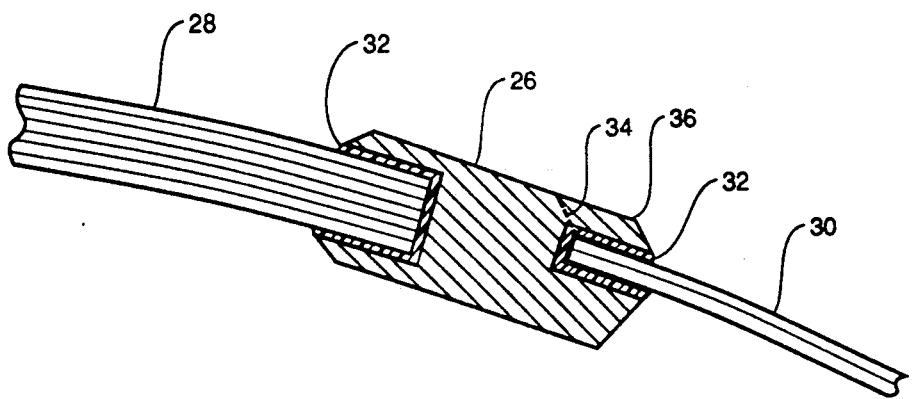
FIG. 3 is a cross-sectional view of a breakable metal bracket for attaching a panel of tougher plastic to a panel of frangible plastic; and, FIG. 4 is a perspective view of an injection molded aircraft canopy transparency having a scored surface according to the teachings of the present invention.

FIG. 3 is a cross-sectional view of a breakable metal bracket 26 for attaching a panel 28 of tougher plastic to a transparent panel 30 of frangible material. Metal bracket 26 includes a thin layer 32 of elastomeric material for sealing. Metal bracket 26 is constructed so that it will preferentially break along a line 34 along one lip 36 when an ejecting ejection seat strikes panel 30.

Metal bracket 26 or elastomeric gasket 20 can serve an additional function of absorbing the dynamic oscillations that will occur in a canopy when a bird strike occurs. While it is unlikely that the panel over the ejection seat will ever need to absorb the impact of a high energy direct bird strike, the resulting dynamic oscillations throughout the canopy from a bird strike on the windshield do need to be sufficiently absorbed so that the frangible panel is not fractured or released as a result of such a bird strike. While the elastomeric bracket 20 of FIG. 2 will probably absorb sufficient energy to prevent damage to the frangible panel, it may become necessary to have a metal bracket, or a combination metal bracket and elastomeric insert, to fully protect the frangible panel.

Figure 4:
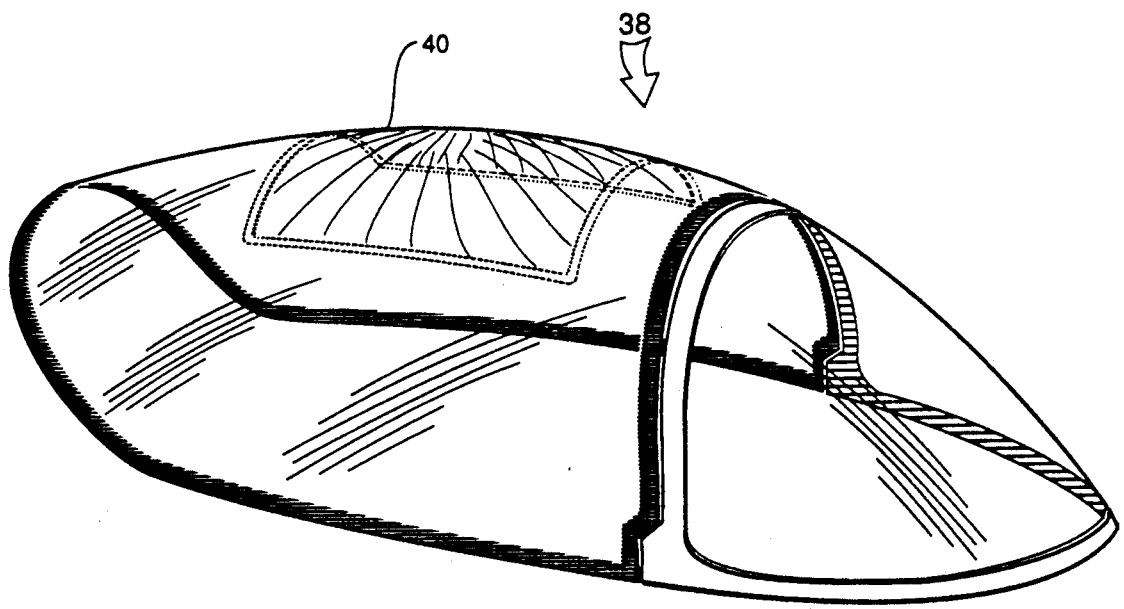

FIG. 4 is a perspective view of an injection molded aircraft canopy transparency 38. Injection molded, or other directly formed aircraft transparencies are described in U.S. Statutory Invention Registration H451, dated Apr. 5, 1988, to Pinnell, which is incorporated by reference. Aircraft canopies made from directly formed transparencies are the latest development in canopies for high-performance aircraft. Injection molding permits much more precise provision of different physical properties at different locations on canopy 38. Typical modern polycarbonate transparencies are laminated structures made sufficiently thick so that they are tough enough to withstand high energy bird strikes. It is difficult to make such laminated structures of varying thickness. Molded transparencies, however, by the very nature of the molding process, can be made of varying thickness. Aircraft canopy transparency 38 is molded thicker at the windshield and sides where a bird strike is more likely, and thinner at its top where bird strikes are less likely. The thinner portion 40 at the top of canopy 38 is scored so that when struck by the top of an ejecting ejection seat, it will preferentially shatter in a pattern designed to both open more quickly and present the least risk of harm to an ejecting aircrew member. Those with skill in the art of the invention will see that scoring is just one of many well-known techniques for making a component break in preselected patterns.

Direct forming permits the use of a more frangible panel over the area where an ejection seat will exit without requiring a sealing gasket or bracket. The thickness of the transparency around the frangible panel portion can be made even thicker, or with different physical properties, to provide any needed flexural strength so that the entire canopy will flex and absorb energy, particularly from a bird strike, in the same manner as a current, unmodified, aircraft cockpit canopy.

Direct forming of an aircraft canopy also permits varying the material composition of the aircraft canopy at different locations to vary the physical properties. Portion 40 can be formulated to be more frangible than the rest of the canopy without requiring making the panel thinner, or scoring it, or in combination with other modifications.

The disclosed aircraft canopy successfully demonstrates that an aircraft canopy can be both tough enough to resist high energy bird strikes and also frangible enough so that an ejecting ejection seat, and its sitting aircrew member, can burst through it without delay and with minimal harm to the aircrew member. The aircraft canopy need only be made tough at those locations where a bird strike is most likely to occur, and frangible at the area above the cockpit through which the ejection seat will pass and which will rarely sustain a bird strike.

Although the disclosed apparatus is specialized, its teachings will find application in other areas where overridingly critical material property requirements seemingly prevent material property modifications for other purposes.

The term transparent panel as used in the claims is understood to include an assembly of one or more similar transparent panels forming a single panel so that such awkward language as "a first at least one transparent panel" may be avoided.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

I claim:

1. An aircraft cockpit canopy for allowing thru-the-canopy ejection of an ejection seat, comprising:
   (a) a first transparent panel for covering part of the area above the cockpit;
   (b) attached to the first transparent panel, a second transparent panel for covering the part of the area above the cockpit not covered by the first transparent panel, wherein the area above the cockpit covered by the second transparent panel is the are through which would pass an ejecting ejection seat; and,
   (c) means for attaching the second transparent panel to the first transparent panel, wherein the attaching means is flexible so that if the second transparent panel were struck by an ejecting ejection seat, the flexible attaching means would flex and release the second transparent panel from its attachment to the first transparent panel.

2. The aircraft cockpit canopy according to claim 1, wherein the means for attaching the second transparent panel to the first transparent panel is characterized as breakable so that if the second transparent panel were struck by an ejecting ejection seat, the breakable attachment means would break and release the second transparent panel from its attachment to the first transparent panel.

* * * * *